United States Patent [19]

Meyer

[11] Patent Number: 5,140,303
[45] Date of Patent: Aug. 18, 1992

[54] SUBMERSIBLE ELECTRONIC FUEL LEVEL SIGNAL DAMPER

[75] Inventor: Paul M. Meyer, Godfrey, Ill.

[73] Assignee: Carter Automotive Company, Inc., St. Louis, Mo.

[21] Appl. No.: 549,852

[22] Filed: Jul. 9, 1990

[51] Int. Cl.⁵ .................... B60Q 1/00; G01F 23/30
[52] U.S. Cl. .................. 340/450.2; 340/618;
340/623; 340/625; 73/304 R; 73/305; 116/110;
200/84 R; 200/190
[58] Field of Search ............ 340/450, 450.1, 450.2,
340/450.3, 612, 618, 623, 624, 625; 73/290 R,
304 R, 305-308; 116/109, 110; 200/84 R, 190

[56] References Cited

U.S. PATENT DOCUMENTS

| | | | |
|---|---|---|---|
| 3,623,043 | 11/1971 | Bozoian | 340/450.2 |
| 4,532,491 | 7/1985 | Rau et al. | 73/308 |
| 4,967,181 | 10/1990 | Iizuka et al. | 340/450.2 |

*Primary Examiner*—Donnie L. Crosland
*Attorney, Agent, or Firm*—Lawrence J. Shurupoff

[57] ABSTRACT

A liquid level responsive sending unit is positionable in a vehicle fuel tank to deliver a signal to a fuel gage on the vehicle dashboard. An electrical damping circuit is provided on a circuit board carried on the sending unit, such that momentary fluctuations in a fuel level sensor float are smoothed out. The signal transmitted to the gage is a signal representing a time-averaged condition of the sensor. The damping circuit location in the fuel tank is advantageous as regards signal accuracy calibration, manufacturing quality control, ease of assembly, and access for component replacement purposes.

11 Claims, 2 Drawing Sheets

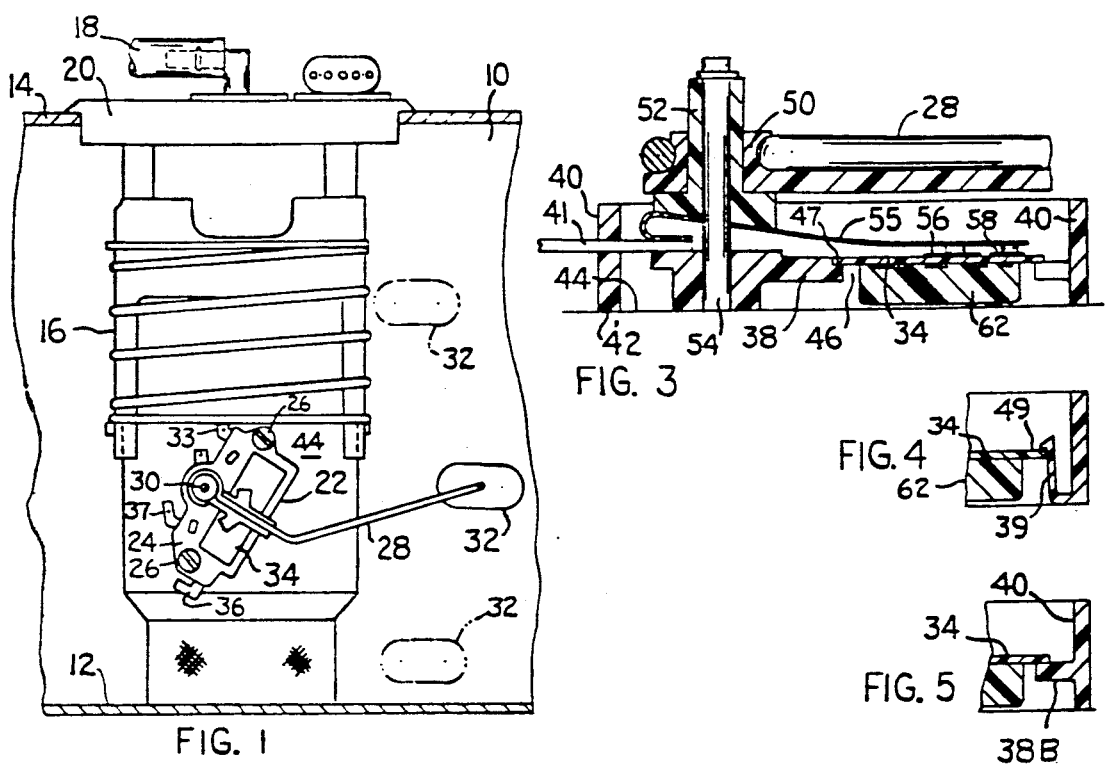
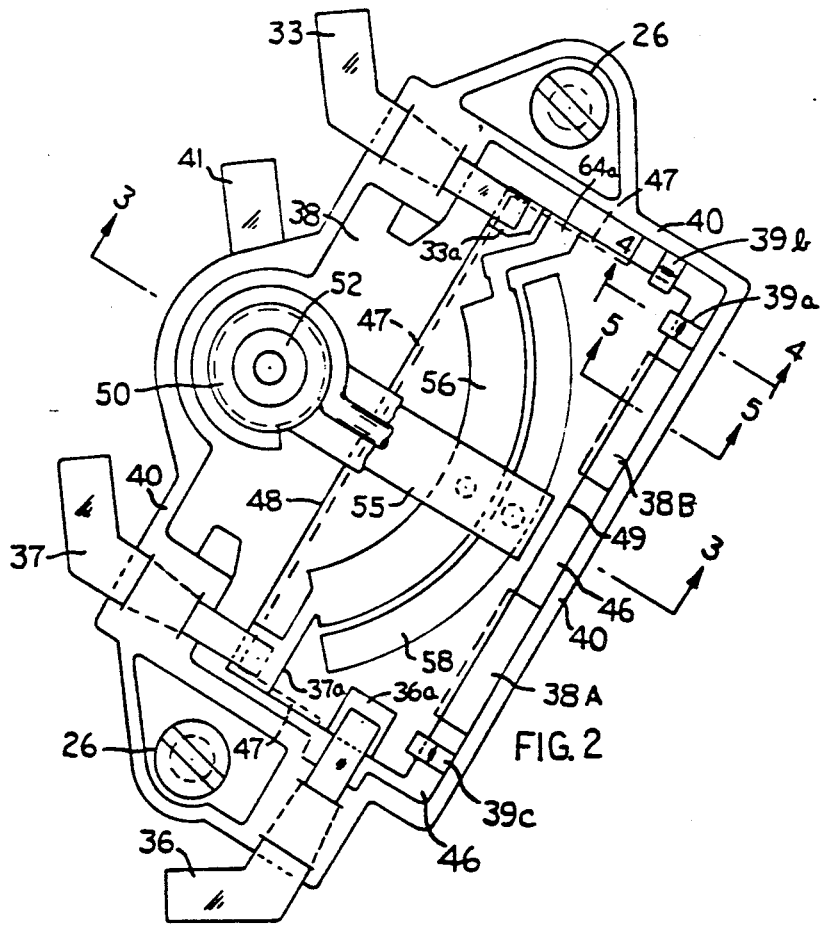

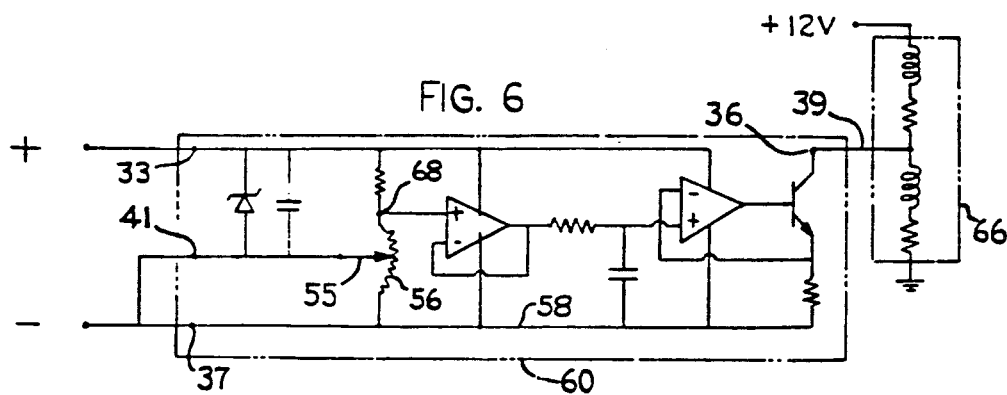
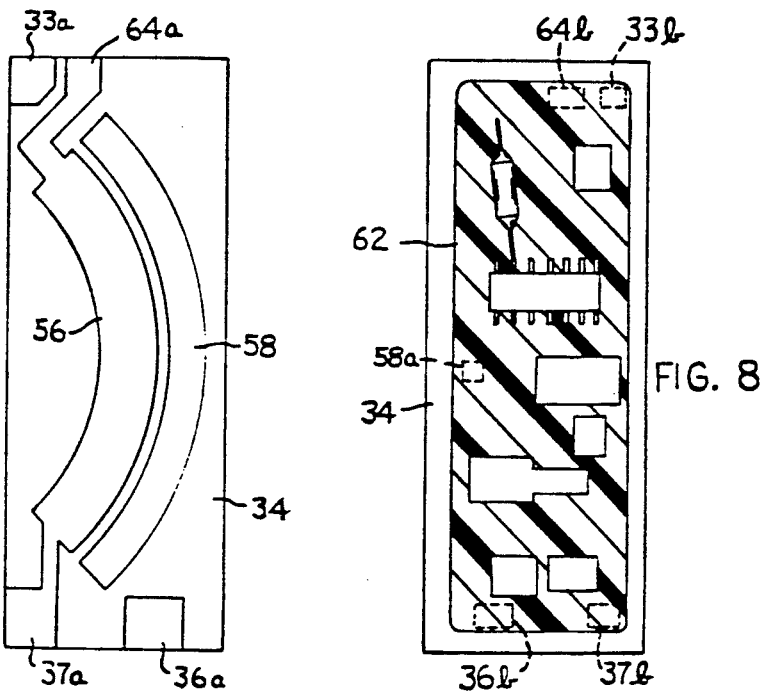
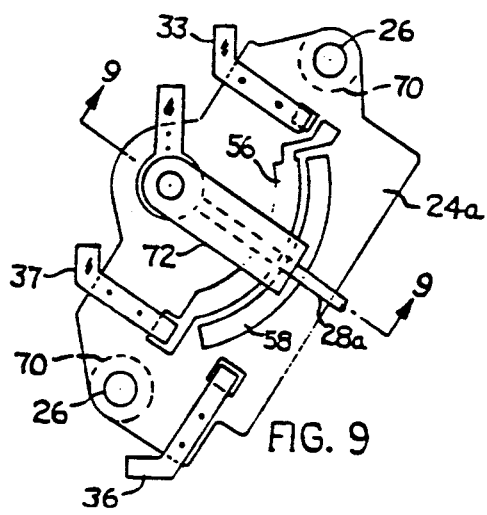
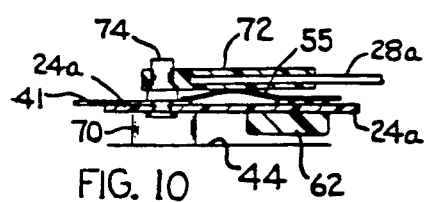

SUBMERSIBLE ELECTRONIC FUEL LEVEL SIGNAL DAMPER

BACKGROUND OF THE INVENTION

1. Field of the Invention

This invention relates in general to liquid level responsive sending units adapted for disposition within fuel tanks and particularly relates to a sending unit that emits an electronically damped fuel level signal from within an automobile or truck fuel tank.

2. Description of Prior Developments

Fuel tank liquid level sensors or sending units commonly include a mounting structure or base located at an intermediate point within a fuel tank, i.e. several inches above the floor of the tank. An arm structure is swingably mounted on the base for swinging motion in a vertical plane and carries a float at its free end. Typically, the arm structure has a length of about five inches, and it swings through a vertical arc of about eighty degrees when going from a lowered (tank empty) condition to a raised (tank full) condition.

This swingable arm structure carries an electrical slider. A cooperating potentiometric resistance is located on the base, such that vertical swinging motion of the float arm structure causes the slider to wipe and slide along the electric resistance, thereby generating an electrical signal related to the fuel liquid level in the tank, i.e. the level sensed by the float.

During certain operational periods of the vehicle, e.g. sudden braking, moving uphill or turning sharply, the fuel in the tank may slosh around or move toward one end of the tank. Momentarily, the float will sense a false liquid quantity, i.e. a liquid level that is not representative of the liquid quantity in the tank. This momentary condition will be sensed by the motorist as a fluttering motion of the fuel level indicator needle in the gage on the dashboard.

In order to minimize or eliminate undesired fluttering or wandering motion of the fuel level indicator needle, it has been proposed to provide an electrical damping circuit in the electrical system between the electrical sending unit in the tank and the electrical needle operator (coil) in the gage. U.S. Pat. Nos. 4,497,205 and 4,635,043 disclose damping circuits that have been proposed There are other circuits that can be used.

These damping circuits receive a fluctuating signal from the sending unit, and translate that signal into an essentially steady state signal that is representative of the average signal generated over a measurable time period, e.g. forty-five seconds or more. This average signal is the signal that is sent to the coil or coils in the fuel level indicator on the dashboard.

The damping circuits do not interfere with the accuracy or normal operation of the fuel level indicator system, since over time the signal sent to the gage reflects long term changes in the liquid fuel levels, i.e. changes requiring more than about a minute of vehicle operation.

It is believed that the damping circuits, when used, have been physically located somewhere in the vehicle dashboard. Present technology is such that wiring within the dashboard is often cluttered and complex, with a maze of wires occupying much of the space behind the dashboard.

SUMMARY OF THE INVENTION

The present invention is directed to a design for packaging a fuel level signal damping circuit as part of the liquid level sending unit in the fuel tank. Since there is little or no space problem in the fuel tank, as compared to the dashboard, the damping circuit may be adequately sized in a physical sense and may be easily mounted within the tank. Also, the damping circuit can be replaced, when necessary, rather easily, due to the fact that a repair technician is able to gain access to the circuit board containing the damping components without having to temporarily remove or disturb other electrical connections that might be in the vicinity of the damping circuit connections.

A further advantage of the newly proposed damping circuit location is the fact that the manufacturer of the sending unit can assume full responsibility for the accuracy of the signal delivered to the receiver unit, i.e. the fuel gage. The sending unit and add-on damping circuit can be calibrated together at a single manufacturing location, thereby providing better overall quality control of the system delivered to the vehicle manufacturer.

Moreover, vehicle manufacturers are placing more reliance on automotive parts suppliers to provide integrated systems which may be assembled into a vehicle with a minimum of labor and which facilitate assembly and reduce assembly time. Because the present invention mounts the electronics of the fuel level signal damper circuit directly on the fuel supply sending unit, vehicle designers no longer need to allocate limited dashboard space for such circuitry and vehicle assemblers need no longer mount such circuitry within the limited confines of the dashboard.

THE DRAWINGS

FIG. 1 is a side elevational view of a float-operated liquid sending unit constructed according to the invention. The sending unit is shown mounted within a fuel tank.

FIG. 2 is an enlarged view of a major component of the FIG. 1 sending unit.

FIG. 3 is a sectional view taken on line 3—3 in FIG. 2.

FIG. 4 is a fragmentary sectional view taken on line 4—4 in FIG. 2.

FIG. 5 is a fragmentary sectional view taken on line 5—5 in FIG. 2.

FIG. 6 is a circuit diagram of a representative damping circuit that can be employed in practicing the invention.

FIG. 7 is a plan view of a circuit board used in the FIG. 2 mechanism.

FIG. 8 is another view of the circuit board, taken from the other direction and showing certain electrical operating components encapsulated within a dielectric protective covering.

FIG. 9 is a view taken in the same direction as FIG. 2, but illustrating another form that the invention can take.

FIG. 10 is a sectional view taken on line 10—10 in FIG. 9.

FIG. 11 is a plan view of a circuit board that can be used in practice of the invention.

DESCRIPTION OF A PREFERRED EMBODIMENT OF THE INVENTION

FIG. 1 illustrates the general environment in which the invention can be practiced. A vehicle fuel tank 10 includes a floor 12 and a ceiling 14. A fuel pumping unit 16 is arranged between the floor and ceiling for delivering liquid fuel, e.g. gasoline, into and through a hose 18 leading to the engine. Fuel pumping unit 16 may be constructed as shown in copending U.S. patent application Ser. No. 342.232, filed on May 5, 1989. The fuel pumping unit includes a cover structure 20 that is detachably connected to the tank ceiling 14, such that the pumping unit can be lifted out of the fuel tank for repair or replacement purposes.

The present invention is particularly concerned with a liquid level responsive sending unit indicated generally by numeral 22. The sending unit includes a base 24 positioned against a side surface of the fuel pumping unit 16. Two screws 26 extend through the base into the pumping unit wall structure to mount the base in a fixed position.

A float arm 28 is swingably attached to base 24 for arcuate movement around a horizontal swing axis 30. At its free end, arm 28 carries a paddle-type float 32. The arm is shown in full lines in a position in which the tank is approximately one third full. The dashed lines show two other float positions, with the tank filled (upper position) and with the tank substantially empty (lower position).

A conventional potentiometric resistance slider mechanism is provided between float arm 28 and base 24 to generate an electrical signal representative of the float position. The present invention relates especially to a circuit board 34 carried or formed on base 24 to modify and filter the electrical signal generated by the electrical slider. The filtered signal is delivered to a spade-like terminal 36 that is adapted for connection to a lead wire (not shown) extending from the sending unit 22 to a readout gage on the vehicle dashboard.

FIGS. 2 through 4 illustrate the structure of the present invention with somewhat greater particularity. As shown, base 24 includes a generally flat wall 38 connected to a peripheral flange 40. Edge 42 of the peripheral flange seats against the mounting surface 44 (FIG. 3) on pumping unit 16, with screws 26 (FIGS. 1 and 2) extending into the pumping unit wall structure to attach the base in a fixed position.

As shown in FIG. 3, circuit board 34 lies in the general plane of wall 38 within an enlarged opening designated generally by numeral 46. Ledges 47 can be formed in areas of wall 38 bordering the enlarged opening, such that the circuit board is precluded from shifting along wall 38. The area of wall 38 bordering edge 48 of board 34 can be in continuous supportive engagement with the circuit board. Opposite edge 49 of the board may be supported on two spaced wall sections 38A and 38B. The intervening space between these wall sections 38A and 38B can serve as an access space for lifting or tilting the circuit board away from wall 38.

The circuit board 34 is held down against wall 38 partly by three electrical terminals 33, 36 and 37. Additional hold down force is provided by spring clips 39a, 39b and 39c (FIGS. 2 and 4). Each clip structure can be manually swung away from edge 49 of board 34 when it is desired to remove the board.

Electric terminals 33, 36 and 37 are fixedly mounted in base 24 so that end areas thereof overhang board 34. The terminals can be located as inserts in the mold cavity used to form base 24. Alternately the terminals can be installed on the base by forcing them through slots in raised peripheral areas of the base. The overhanging portions of the terminals are resilient because of the cantilevered manner in which the terminals are mounted. The overhanging portions of the terminals thereby exert resilient pressure on the subjacent areas of the circuit board.

The float arm 28 is shown as a rod-like element having a circularly-turned end portion clamped around a hub element 50 (FIG. 3). Element 50 has a press fit on a sleeve element 52 that is rotatably positioned on a stationary steel shaft or post 54. An electrical slider 55, formed of an electrically conductive spring material, is attached to sleeve element 52 so that when element 52 is inserted into shaft 54 the curled end of slider 55 will make pressure contact with a flat-surfaced terminal 41 mounted on base 24. The free end of slider 55 has two electrical contacts thereon located to have pressure engagement, respectively, with a potentiometric resistance 56 and a fully conductive bridging strip 58.

During swinging motion of the float arm, slider 55 has continuous contact with terminal 41 and conductive strip 58. Therefore, these three components have the same electrical potential. With the circuit shown in FIG. 6, these components serve as a ground connection from the circuit board to the external circuitry.

One face of circuit board 34 faces toward slider 55. The other face of board 34 faces away from slider 55 (i.e. downward in FIG. 3). A filtering circuit is formed on that other face of the board. The filtering circuit includes a printed circuit on the board surface, and electrical operating components (resistors, capacitors, amplifiers) mounted on the printed circuit. The filtering circuit is shown in FIG. 6 as the area generally circumscribed by numeral 60. An encapsulating dielectric material 62 (FIGS. 3 and 8) is provided on and around the electrical operating components to shield them from the ambient environment which may include fuel such as gasoline, gasoline additives (methanol, ethanol, MTBE etc.) and possibly water, dirt, acids, sludge, etc.

The surface of board 34 containing resistance 56 has four electrical pads 33a, 37a, 36a, and 64a thereon. The reverse face 33b, 37b, 36b and 64b thereon (FIG. 8). The respective pads are electrically connected to form circuit connections for the printed circuit and the operating components. Bridging strip 58 may be connected to the printed circuit via an electrical connection 58a (FIG. 8).

The filtering circuit on board 34 is electrically connected to the external circuitry by the four terminals 33, 36, 37 and 41. FIG. 6 indicates the four terminals as component parts of the circuit lines at the limits of the filtering (signal damping) circuit 60. Also shown in FIG. 6 is a fuel gage or meter 66 having transducer coils electrically connected to a line 39 leading from terminal 36. In actual practice gage 66 would be located on the vehicle dashboard, and the connector line 39 would extend between the fuel tank and the fuel gage on the vehicle dashboard.

Filtering circuit 60 functions so that momentary fluctuations in potential at junction 68 are damped or averaged out in the signal appearing in line 36. The result is that the fuel gage needle in meter 66 takes a reasonably steady position, without abrupt momentary fluctuations that might otherwise be caused by momentary changes in the position of slider 55 due to fuel sloshing within the fuel tank.

What is believed to be new is the packaging of the filtering circuit on a submersible circuit board 34 carried on the base 24 of a liquid level sending unit 22. The circuit board is in an easily accessible position adjacent to the float arm assembly and slider 55. Troubleshooting of the electrical portion of the fuel level sending unit can be accomplished at one place in the vehicle. Also, calibration and quality control on the accuracy of the signal (line 36) supplied to gage 66 can be accomplished expeditiously by one manufacturer. Quality control becomes the responsibility of one source, rather than being an arguing point between different suppliers.

FIG. 11 shows a circuit board that can be used in practice of the invention. The board has the same construction and configuration as the board shown in FIGS. 2 and 7, except that test pads 70 have been added at preselected points along the length of potentiometric resistance 56. These test pads facilitate calibration and quality control procedures on the board and its operating components. Resistance values are checked between pad 64a and the individual test pads 70. Voltage levels are checked between pad 33a and the individual test pads 70.

The test pads 70 facilitate quality control procedures without adversely affecting in-service performance of the circuit board. The presence of the test pads has no effect on performance of the circuit board during service.

In the system shown in FIGS. 1 through 8, the circuit board 34 is separate from base 24. It is possible to build the circuit board into the base, i.e. make the board an integral part of the base. FIGS. 9 and 10 illustrate one way of forming the circuit board as an integral part of the base. In this case the base 24a is built as a flat panel; the electrical system is mounted directly on this panel, such that the base and circuit board become one integral member. Spacers 70 are affixed to one face of the panel to space the panel away from the mounting surface 44 on the associated fuel pumping unit.

The float arm 28a can include a plastic arm 72 having a rotary fit on an upstanding plastic post 74 suitably attached to panel 24a. The associated slider 55 can be attached to the undersurface of arm 72. FIGS. 9 and 10 represent a less preferred construction according to the teachings of the invention. A preferred arrangement is depicted in FIGS. 1 through 8.

It is believed that the invention can be practiced in other forms than the specific constructions shown in the drawings.

What is claimed:

1. A liquid level responsive sending unit for disposition within a vehicle fuel tank, comprising: a base; a float support attached to said base for vertical movement; an electrical slider carried on said float support; a dielectric circuit board carried on the base; said board having a first surface thereof facing the slider; an electrical potentiometric resistance extending along said first surface of the board such that the slider has wiping contact on the resistance; and electrical filter circuit means mounted on the sending units, said filter circuit means having an input signal representative of the instantaneous position of the slider and an output signal representative of the average position of the slider over a measurable time period; a plurality of electrical pads located on said first surface of said board, and electrical terminals mounted on said base to electrically contact said pads when the board is installed on the base and wherein each terminal has a projecting end portion adapted to overhang the board, each terminal being resilient for exerting a resilient pressure on the associated pad.

2. The sending unit of claim 1, and further comprising a dielectric encapsulating material covering the electrical filter circuit means.

3. The sending unit of claim 2, wherein said base comprises a flat wall structure having an enlarged opening therethrough, said dielectric circuit board being seated flatwise on said wall structure with the encapsulating material projecting through the opening.

4. The sending unit of claim 3, and further comprising resilient clip means carried on said base to engage an edge area of the board to prevent dislocation of the board from the base.

5. The, sending unit of claim 4, wherein said resilient clip means comprises a swingable clip structure movable parallel to the board plane to engage said edge area of the board.

6. The sending unit of claim 1, wherein said base comprises a flat wall structure, and a peripheral flange extending around edge areas of said wall structure; said flat wall structure having an enlarged opening therethrough, said opening being circumscribed by shoulders formed integrally with the flat wall structure whereby the circuit board is immovably positioned on the flat wall structure within the enlarged opening.

7. The sending unit of claim 6, further comprising a dielectric encapsulating material covering the electrical filter circuit means; said circuit board being positioned on the flat wall structure so that the encapsulated electrical filter circuit means project through the enlarged opening in the flat wall structure.

8. The sending unit of claim 7, wherein said peripheral flange extends a sufficient distance from the plane of the flat wall structure as to form a shroud around the encapsulated operating components.

9. The sending unit of claim 7, and further comprising at least one circuit connection between said resistance and said electrical filter circuit means.

10. A liquid level responsive sending unit for disposition within a vehicle fuel tank, comprising: a base, a float support attached to said base for vertical movement; an electrical slider carried on said float support; a dielectric circuit board carried on the base; said board having a first surface thereof facing the slider; an electrical potentiometric resistance extending along said first surface of the board such that the slider has wiping contact on the resistance; an electrical filter circuit mans mounted on the sending unit, said filter circuit means having an input signal representative of the instantaneous position of the slider and an output signal representative of the average position of the slider over a measurable time period; said filter circuit means comprising a printed circuit; a dielectric encapsulating material covering the electrical filter circuit means; said base comprising a flat wall structure having an enlarged opening therethrough, said dielectric circuit board being seated flatwise on said wall structure with the encapsulating material projecting through the opening; and resilient clip means carried on said base to engage an edge area of the board to prevent dislocation of the board from the base.

11. A liquid level responsive sending unit for disposition within a vehicle fuel tank, comprising: a base; a float support attached to said base for vertical movement; an electrical slider carried on said float support; a dielectric circuit board carried on the base; said board having a first surface thereof facing the slider; an electrical potentiometric resistance extending along said first surface of the board such that the slider has wiping contact on the resistance; an electrical filter circuit means mounted on the sending unit, said filter circuit means having an input signal representative of the instantaneous position of the slider and an output signal representative of the average position of the slider over a measurable time period; said filter circuit means comprising a printed circuit; a dielectric encapsulating material covering the electrical filter circuit means; said base comprising a flat wall structure having an enlarged opening therethrough, said dielectric circuit board being seated flatwise on said wall structure with the encapsulating material projecting through the opening; resilient clip means carried on said base to engage an edge area of the board to prevent dislocation of the board from the base; and said resilient clip means comprising a swingable clip structure movable parallel to the board plane to engage an edge area of the board.

* * * * *

UNITED STATES PATENT AND TRADEMARK OFFICE
CERTIFICATE OF CORRECTION

PATENT NO. : 5,140,303
DATED : August 18, 1992
INVENTOR(S) : Paul M. Meyer

It is certified that error appears in the above-indentified patent and that said Letters Patent is hereby corrected as shown below:

Column 1, line 48, after 'proposed' insert thereat --.--

Column 4, line 46, after 'face' insert thereat --of the board containing the printed circuit has electrical pads--

Column 5, line 62, claim 1, delete "units," and insert thereat --unit,--

Column 6, line 18, claim 5, delete "The," and insert thereat --The--

Column 6, line 52, claim 10, delete "mans" and insert thereat --means--

Signed and Sealed this

Twenty-eighth Day of September, 1993

Attest:

BRUCE LEHMAN

*Attesting Officer*     *Commissioner of Patents and Trademarks*